(12) United States Patent
Ramanzin

(10) Patent No.: US 8,139,646 B2
(45) Date of Patent: Mar. 20, 2012

(54) SPLICING MPEG STREAMS COMPARING OFFSET AND REFERENCE TIME VALUE

(75) Inventor: Yves Ramanzin, Boulogne-Billancourt (FR)

(73) Assignee: NXP B.V., Eindhoven (NL)

( * ) Notice: Subject to any disclaimer, the term of this patent is extended or adjusted under 35 U.S.C. 154(b) by 545 days.

(21) Appl. No.: 11/718,139

(22) PCT Filed: Oct. 27, 2005

(86) PCT No.: PCT/IB2005/053510
§ 371 (c)(1),
(2), (4) Date: Mar. 26, 2009

(87) PCT Pub. No.: WO2006/046212
PCT Pub. Date: May 4, 2006

(65) Prior Publication Data
US 2009/0201985 A1   Aug. 13, 2009

(30) Foreign Application Priority Data
Oct. 29, 2004 (EP) .................... 04300748

(51) Int. Cl.
*N04N 7/12* (2006.01)
(52) U.S. Cl. ................................. 375/240.26

(58) Field of Classification Search ............. 375/240.01, 375/240.26; *H04N 11/04, 7/12*
See application file for complete search history.

(56) References Cited

U.S. PATENT DOCUMENTS
6,792,047 B1   9/2004  Bixby et al.
2002/0041629 A1*  4/2002  Hannuksela ............. 375/240.12

FOREIGN PATENT DOCUMENTS
EP   0966161 A   12/1999
EP   1014729 A   6/2000

* cited by examiner

*Primary Examiner* — Young Lee
*Assistant Examiner* — Tracy Li

(57) ABSTRACT

The present invention relates to a method of assembling a first data stream (ds1) with a second data stream (ds2), each data stream comprising coded frames (I,P), each coded frame being associated with a relative time value, specific coded frames of a data stream being preceded by an absolute time value. Said method comprises the steps of:
calculating a current reference time value for a current coded frame on the basis of a previous reference time value and on an integer part of the current relative time value,
calculating an offset time value on the basis of the reference time value of the last frame in the display order of the first data stream,
modifying the absolute time values of the specific coded frames of the second data stream by adding the offset time value to said absolute time values.

12 Claims, 3 Drawing Sheets

SPLICING MPEG STREAMS COMPARING OFFSET AND REFERENCE TIME VALUE

FIELD OF THE INVENTION

The present invention relates to a method of assembling two data streams.

It may be used, for example, in any editor of MPEG4 files, said editor being embedded on apparatuses such as mobile phones.

BACKGROUND OF THE INVENTION

The assembling of two video streams in the compressed domain is currently investigated but no implementation has been proposed yet. Even if both streams have been coded with the same parameters, they cannot be just concatenated in the case of the MPEG standard. Indeed, a MPEG4 video stream comprises Video Object Planes VOPs, each VOP being associated with a time stamp. These time stamps are necessary to insure the continuity of the time line. In MPEG4 video streams, said time stamps are coded using variable length codes. It is therefore not possible to just change some bits in each VOP headers in order to insure the time line continuity.

An obvious approach would be to decode each VOP of the second of the two video streams to be assembled and to re-code it with a modified time stamp taking into account the last time stamp of the first of the two video streams.

However, this solution is not satisfactory since, on the one hand, it degrades the visual quality of the second video stream and, on the other hand, it is resource consuming.

SUMMARY OF THE INVENTION

It is an object of the invention to propose a method of and a device for assembling two data streams, which provides a better quality than the one of the prior art.

It is another object of the invention to propose a method of and a device for assembling two video streams, which is less resource consuming than the one of the prior art.

To this end, the method of assembling two data streams in accordance with the invention is characterized in that it comprises:

calculating a reference time value for a current coded frame on the basis of a previous reference time value and on an integer part of the current relative time value, calculating an offset time value on the basis of the reference time value of the last frame in the display order of the first data stream, and modifying the absolute time values of the specific coded frames of the second data stream by adding the offset time value to said absolute time values.

As a consequence, the method in accordance with the present invention is able to assemble two data streams in the compressed domain without decoding nor coding any coded frame while ensuring the time line continuity. Therefore, said method provides a better quality and is less resource consuming than the one of the prior art, since it does not need a complete decoding and re-coding.

According to an embodiment of the invention, the assembling method further comprises the steps of:

calculating a modified relative time value for the first frame in the display order of the second data stream from an initial relative time value of said first frame so that said first frame is shifted in the middle of a temporal gap between the last frame of the first data stream and said first frame, adding a non-coded frame having a null data content in the second data stream, said non-coded frame being associated with the initial relative time value.

According to another embodiment of the invention, the assembling method further comprises the steps of:

decoding a first set of coded frames at the end of the first data stream and a second set of coded frames at the beginning of the second data stream, modifying decoded frames of the first set and the second set in such a way that a smooth transition is ensured between the first set and the second set, coding the modified decoded frames and coding their associated relative time values.

Beneficially, the assembling according to said another embodiment further comprises a step of creating at least one additional frame between the first set and the second set of decoded frames. The last decoded frame of the second set is also not modified.

The present invention also relates to a device for implementing the method of assembling two data streams, to a mobile apparatus including such a device, and to a computer program product comprising program instructions for implementing said method.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention is described in the case of the assembly of two MPEG4 video streams. However, it will be apparent to a skilled person that the present invention applies more generally to the assembly of a first data stream with a second data stream, each data stream comprising coded frames, each coded frame being associated with a relative time value, specific coded frames of a data stream being preceded by an absolute time value. The data stream can be, as another example, an audio stream. The absolute time value is used, for example, for random access to the data stream. In the case of the assembly of two MPEG4 video streams, the coded frames are called Video Object Planes VOPs.

MPEG4 aims at providing a very flexible coding framework, covering a large range of applications in terms of functionality, format, bit rate, or frame rate. Concerning frame rate, MPEG4 supports any rate up to 65535 frames per second fps, and the coding rate can be variable and non-integer. As a consequence, the composition time of each VOP has to be transmitted within the bit-stream in order to enable a time consistent display at the decoder side. Considering the large range of frame rates covered, an efficient way to code time has been designed.

The basic time unit of MPEG4 video is the second. In order to support any frame rate greater than 1 fps a subdivision of the second has to be defined, this subdivision is called a tick.

Figure 1:
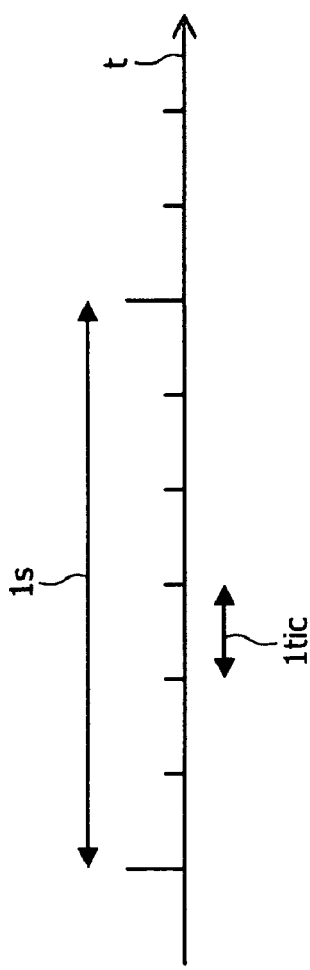
FIG. 1 illustrates the time line division in ticks.

FIG. 1 illustrates that time division. The tick tic is the elementary element of time coding: it means that every time values are expressed as an integer number of ticks. The number of ticks is transmitted in the Video Object Layer VOL header using the vop_time_increment_resolution vtir field. This vtir field indicates the number of ticks tic contained in 1 second s. It gives therefore the tick duration which is 1000/vtir ms. This vtir field does not indicate the coding frame rate, it only indicates the maximum frame rate one can encounter in the VOL since at most a VOP will correspond to each tick. In the example of FIG. 1, there are vtir=6 ticks in one second so that the tick duration is 166 ms.

In the video stream, time is also carried by a specific header called GOV (for Group of VOPs). The GOV header is a header which carries an absolute time value coded as hours/minutes/seconds. Said GOV header enables random access in the video stream since it is always followed by an Intra coded I-VOP (namely a VOP coded without reference to another VOP), so that no previously decoded information is needed to start decoding.

The composition time (or time stamp) of each VOP is then coded through two fields of the VOP header: vop_time_increment vti and modulo_time_base mtb. The mtb field enables to determine the second to which the VOP belongs, the vti field determines the exact position in number of ticks of the VOP within that second.

The VOP composition time is differentially coded: it means that vti and mtb fields associated with a VOP are coded relative to the value of a second of reference sref expressed in an integer number of second (i.e. the vti and mtb fields gives a relative time value).

Figure 2:
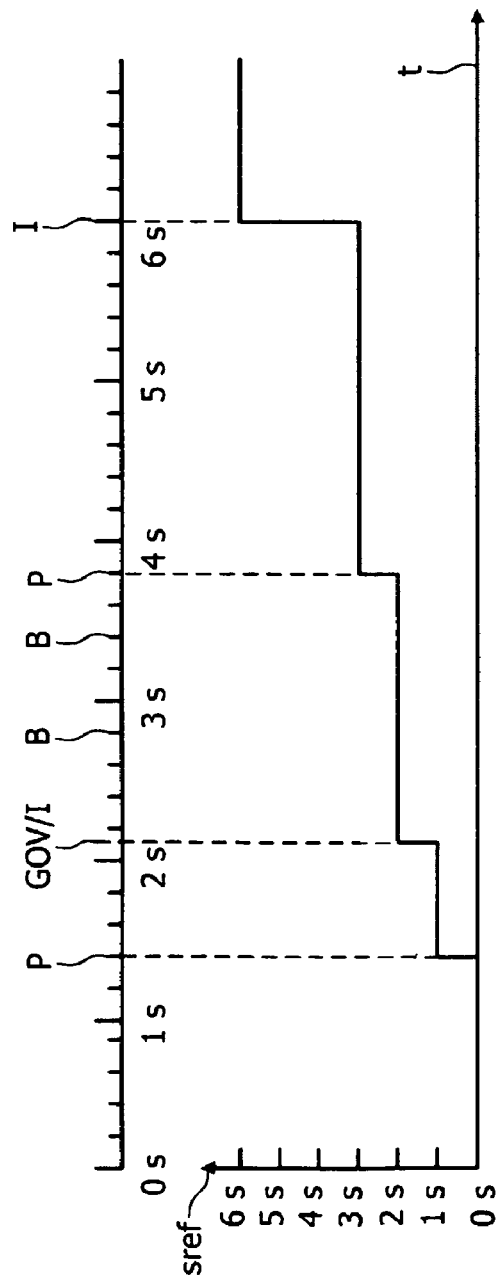
FIG. 2 shows the evolution of the value of a second of reference along a time line.

On the base layer, for I-VOPs and Predicted coded P-VOPs (i.e. VOP coded with reference to a previous P-VOP or I-VOP), this second of reference sref is defined by the time, rounded to the inferior second, decoded in the previous GOV, I-VOP or P-VOP in the decoding order. For Bi-directionally Predicted coded B-VOPs (i.e. VOP coded with reference to a previous and future P-VOP or I-VOP), this second of reference sref is defined by the time, rounded to the inferior second, decoded in the previous GOV, I or P-VOP in the display order. FIG. 2 shows the evolution of the value of the second of reference sref for the base layer of a given video stream. On the enhancement layer, for all VOPs, this second of reference sref is defined by the time, rounded to the inferior second, decoded in the previous GOV or VOP in the display order.

The mtb field indicates the difference between the VOP composition time rounded to the inferior second and the value of the second of reference. In the video stream, this mtb field is coded by as many '1' as the value of that difference followed by a '0'. The vti field is coded using the number of bits necessary to be able to code the vtir value. For example, if there are only 2 ticks per second, only 2 bits are used to code the vop_time_increment field, whereas if there are 25 ticks per second 5 bits are necessary.

The VOP composition time is expressed as the sum of a number of seconds and of a number of ticks inferior to the vtir value.

The VOP composition time is updated after decoding each VOP or when a GOV header is encountered.

In order to assemble a first MPEG4 video stream with a second MPEG4 video stream, the method in accordance with the invention comprises the following steps.

In a first step, a composition time or current time value t[i] is calculated for a each coded VOP F[i] (where F is an I, P or B VOP) of the first video stream ds1 on the basis of a previous reference time value (i.e. second of reference) sref[t−k] given by the last GOV header, I-VOP, P-VOP or B-VOP, where k is an integer depending on the number of B frames per GOV and on the coding layer (base or enhanced), and on the current relative time value given by the values mtb[i] and vti[i], as described before. In other words, the current composition time, expressed in number of ticks, is calculated according to the following equation:

$$t[i]=(sref[i-k]+mtb[i]) \cdot vtir+vti[i].$$

A current reference time value sref[i] is then derived for I-VOP in the base layer or any VOP in the enhanced layer(s), as follows:

$$sref[i]=sref[i-k]+mtb[i].$$

In a second step, an offset time value is calculated on the basis of the reference time value sref[n] of the last VOP P[n] in the display order of the first video stream. Said offset time value off is calculated as follows:

$$off=sref[n] \text{ if } vti[n]<vti[n+1],$$

$$off=sref[n]+1 \text{ if } vti[n] \geq vti[n+1],$$

where n+1 is the index of the first VOP of the second video stream ds2.

In a third step, the initial absolute time values tgov2_ini contained of the GOVs of the second video stream ds2 are modified by adding the offset time value off to these initial absolute time values so as to obtain a modified absolute time value tgov2_mod:

$$tgov2\_mod=tgov2\_ini+off.$$

Thus, the absolute time value carried in the first GOV of the second video stream ds1, just before the first I-VOP I[n+1], is calculated so that the composition time of the first VOP of the second video stream immediately follows the composition time of the last VOP of the first video stream and that the second video stream can be played immediately after playing the first video stream. Then, the value carried by each GOV encountered in the second video stream is updated by adding the calculated offset time value.

Since the relative time values associated with a VOP are given as a position in a second of reference, there can be a temporal gap δt between the last frame of the first data stream and the first frame of the second data stream, which gap δt is expressed in a number of ticks and can extend up to 1 second. From the end-user point of view this results in a freeze on the last frame of the first data stream during the length of the temporal gap, and then the playback resumes normally.

To overcome this problem, the method in accordance with an embodiment of the present invention further comprises the following steps.

In a first step, a new reference time value sref'[n+1] is calculated for the first frame I[n+1] of the second data stream, i.e. new values of mtb'[n+1] and vti'[n+1] are calculated, so that I[n+1] is moved in the middle of the temporal gap.

Figure 3:
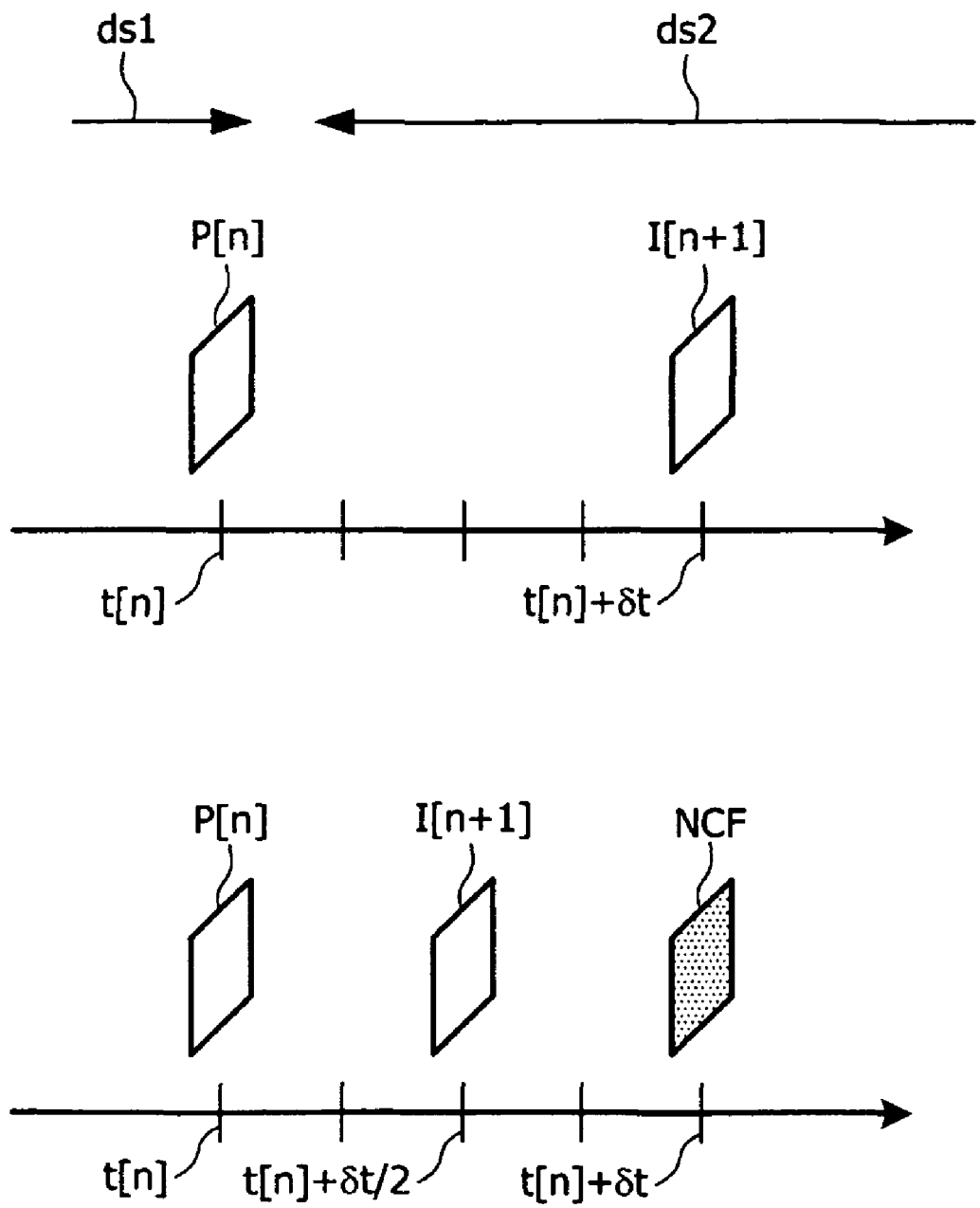
FIG. 3 illustrates an embodiment of the assembling method in accordance with the invention.

This is illustrated in FIG. 3. The composition time of the last frame P[n] in the display order of the first data stream is t[n] and the initial composition time of the first frame I[n+1] of the second data stream is t[n+1]=t[n]+δt. If the number of ticks is even, then the frame I[n+1] is shifted to the composition time t'[n+1]=t[n]+δt/2. The corresponding relative time value (i.e. mtb'[n+1] and vti'[n+1]) is derived accordingly. If the number of ticks is odd, then the frame I[n+1] is shifted to the composition time t'[n+1]=t[n]+(δt±1)/2. The corresponding relative time value (i.e. mtb'[n+1] and vti'[n+1]) is also derived accordingly.

Then, in a second step, a new frame NCF, for example, a non-coded frame (i.e. a frame with a null content also referred to as VOP not coded in the MPEG4 standard), is added. This non-coded frame has the initial composition time t[n+1] of the first frame I[n+1] of the second data stream and therefore the same relative time value (i.e. the same values of mtb[n+1] and vti[n+1] fields). This non-coded frame ensures the continuity of the time line of all the following frames of the second data stream. For the end-user, this results in the impression that the freeze lasts half the duration of the temporal gap, since he observes two freezes of ½ temporal gap.

Figure 4:
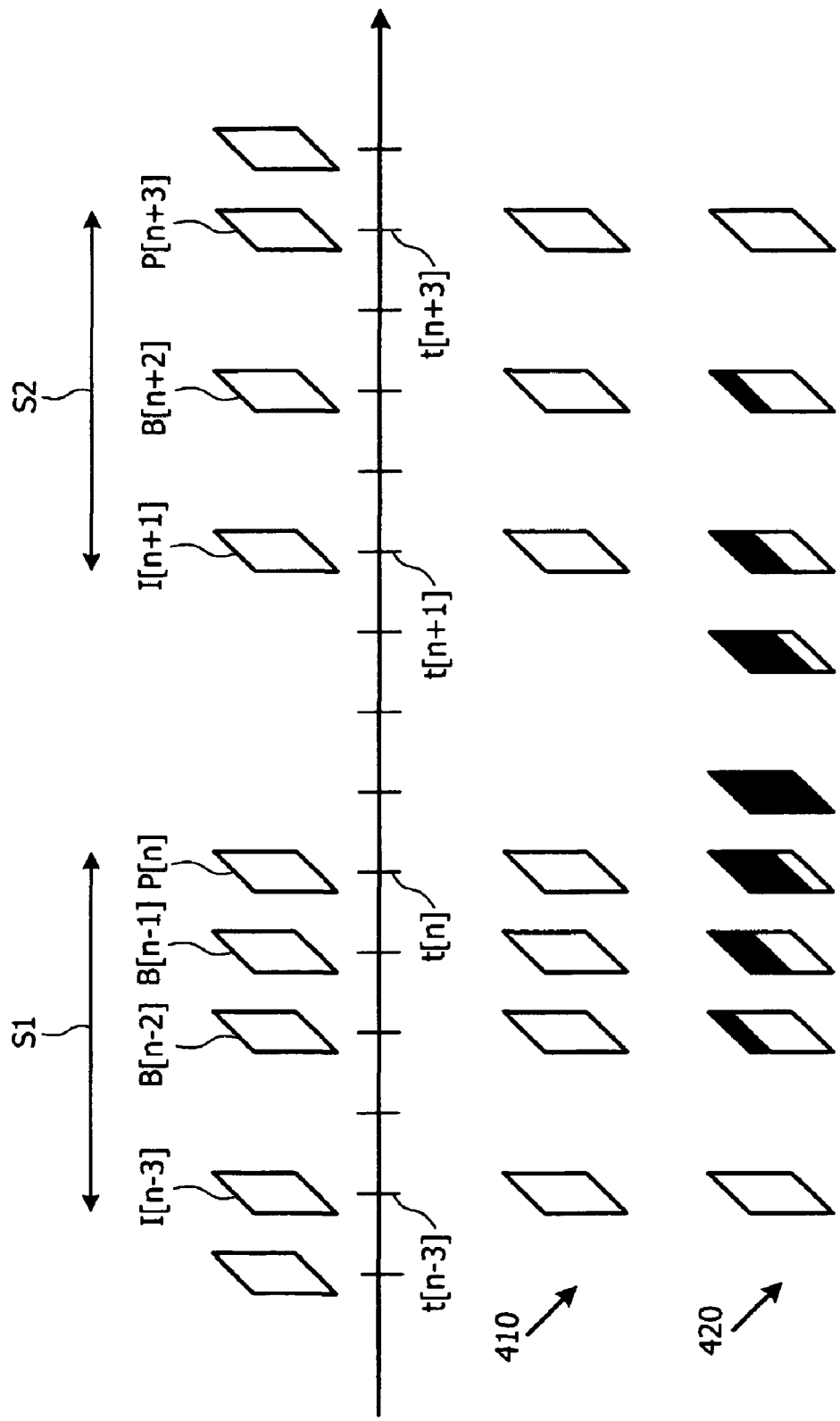
FIG. 4 illustrates another embodiment of the assembling method in accordance with the invention.

Referring to FIG. 4, another embodiment of the invention is depicted. According to this embodiment, the method of assembling two data streams comprises the following steps.

In a first step 410, a first set S1 of coded frames at the end of the first data stream and a second set S2 of coded frames at the beginning of the second data stream are decoded. It will be apparent to a skilled person that the decoding must take into account the constraints imposed by the predictive coding technique. In the case of MPEG4, for example, a B-VOP B[n−1] can only be decoded if its previous and future reference VOPs, represented by I[n−3] and P[n] in FIG. 4, respectively, have been decoded. Similarly, a P-VOP P[n] can only be decoded if its previous VOP, represented by I[n−3] in FIG. 4, has been decoded. The first and second sets of coded frames constitute an intermediary data stream.

In a second step 420, the intermediary data stream is modified in such a way that a smooth transition is ensured between the first and second sets of coded frames. For example, a kind of black curtain can be added on the decoded frames, said curtain being "closed" progressively and then being "opened" progressively, as shown in FIG. 4. Alternatively, the decoded frames can progressively be darkened and then switched on again progressively.

In an optional third step, at least one additional frame is added in the temporal gap between the first set S1 and second set S2 of frames. These additional frames improve the transition between the two sets of frames and are computed from the last decoded frame in the display order of the first data stream and/or the first decoded frame in the display order of the second data stream.

In a next step, the modified decoded frames and possible additional frames constituting the intermediary data stream are coded and their associated relative time values are also coded according to their respective positions in the time line.

In a final step, the absolute time values contained in the GOV header of the second data stream are modified by adding the offset time value to said time values, as described before.

It should be noted that the last decoded frame of the second data stream is preferably not modified during the second step in order not to alter the subsequent decoding of the concatenation of the first data stream without the first set of coded frames, the intermediary data stream, and the second data stream without the second set of coded frames.

Thanks to this other embodiment of the invention, the time line continuity is ensured. Moreover, it is not necessary to re-code the first frame of the intermediary data stream as an intra coded frame. The method of assembling is then a simple concatenation of the three data streams, plus the update of the values carried by the GOV headers of the second data stream without the second set of coded frames, as described before.

It should be noted that the above-mentioned embodiment illustrates rather than limits the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of assembling a first data stream with a second data stream, each data stream comprising coded frames, each coded frame being associated with a relative time value having an integer part determining a period of time to which the coded frame belongs and a part determining the position of the coded frame within said period of time, specific coded frames of a data stream being preceded by an absolute time value, said method comprising the steps of:

calculating a current reference time value for a current coded frame on the basis of a previous reference time value and on an integer part of the current relative time value;

calculating an offset time value on the basis of the reference time value of the last frame in the display order of the first data stream, wherein the offset time value is equal to the reference time value of the last coded frame in the display order of the first data stream if the part determining the position of the last coded frame in the display order of the first data stream within the period of time is smaller than the part determining the position of the first coded frame in the display order of the second data stream within the period of time, and the offset time value is equal to the reference time value of the last coded frame in the display order of the first data stream plus one if the part determining the position of the last coded frame in the display order of the first data stream within the period of time is greater than or equal to the part determining the position of the first coded frame in the display order of the second data stream within the period of time; and modifying the absolute time values of the specific coded frames of the second data stream by adding the offset time value to said absolute time values of said second data stream.

2. A method as claimed in claim 1, further comprising the steps of:

calculating a modified relative time value for the first frame in the display order of the second data stream from an initial relative time value of said first frame so that said first frame is shifted in the middle of a temporal gap between the last frame of the first data stream and said first frame, adding a non-coded frame having a null data content in the second data stream, said non-coded frame being associated with the initial relative time value.

3. A method as claimed in claim 1, further comprising the steps of:

decoding a first set of coded frames at the end of the first data stream and a second set of coded frames at the beginning of the second data stream, modifying decoded frames of the first set and the second set in such a way that a smooth transition is ensured between the first set and the second set, coding the modified decoded frames and coding their associated relative time values.

4. A method as claimed in claim 3, further comprising the step of creating at least one additional frame between the first set and second set of decoded frames.

5. A method as claimed in claim 3, in which the last decoded frame of the second set is not modified.

6. A non-transitory computer medium comprising program instructions for implementing, when said program is executed by a processor, a method as claimed in claim 1.

7. The method of claim 1, wherein the current reference time value for a current coded frame is the sum of the previous reference time value and the integer part of the current relative time value.

8. The method of claim 1, wherein the relative time value is coded using a variable length code.

9. The method of claim 1, wherein the period of time is a second.

10. The method of claim 1, wherein the data stream is an MPEG4 video stream.

11. A device for assembling a first data stream with a second data stream, each data stream comprising coded frames, each coded frame being associated with a relative time value having an integer part determining a period of time to which the coded frame belongs and a part determining the position of the coded frame within said period of time, specific coded frames of a data stream being preceded by an absolute time value, said device comprising:
  means for calculating a reference time value for a current coded frame on the basis of a previous reference time value and on an integer part of the current relative time value,
  means for calculating an offset time value on the basis of the reference time value of the last frame in the display order of the first data stream, wherein
    the offset time value is equal to the reference time value of the last coded frame in the display order of the first data stream if the part determining the position of the last coded frame in the display order of the first data stream within the period of time is smaller than the part determining the position of the first coded frame in the display order of the second data stream within the period of time, and
    the offset time value is equal to the reference time value of the last coded frame in the display order of the first data stream plus one if the part determining the position of the last coded frame in the display order of the first data stream within the period of time is greater than or equal to the part determining the position of the first coded frame in the display order of the second data stream within the period of time; and
  means for modifying the absolute time values of the specific coded frames of the second data stream by adding the offset time value to said absolute time values of said second data stream.

12. A mobile apparatus comprising a device as claimed in claim 11.

* * * * *